Patented Sept. 7, 1937

2,092,622

UNITED STATES PATENT OFFICE 2,092,622

ARTIFICIAL TANNING SUBSTANCES AND PROCESS OF PREPARING THEM

Ernst Koch and Christoph Thomsen, Frankfort-on-the-Main-Hochst, Germany, assignors to I. G. Farbenindustrie Aktiengesellschaft, Frankfort-on-the-Main, Germany No Drawing. Application July 23, 1936, Serial No. 92,252. In Germany April 13, 1935

14 Claims. (Cl. 149—5)

The present invention relates to artificial tanning substances.

Various processes are already known for transforming substances containing cellulose or lignin into resins by treating them with phenols in the presence of mineral acids. These products do not possess any tanning properties, they are soluble in water only by the addition of alkalies and precipitate again on neutralizing or acidifying these solutions.

Now we have found that tanning substances resembling the vegetable tanning substances may be obtained from solid substances containing cellulose, lignin or humin by causing these solid substances to act with hydroxy aryl compounds and rendering the products obtained soluble in water by the introduction of methyl sulfonic acid groups.

As substances containing cellulose, lignin or humin there may be used: wood, peat, lignite, bark, straw, residues from the saccharification of wood or peat and similar products. As hydroxy aryl compounds there may, for instance, be used phenol, ortho-, meta- and para-cresol, salicylic acid, cresotinic acid, alpha-naphthol, beta-naphthol and technical mixtures of these compounds, such as crude cresol, creosote oil and others.

The said substances may be condensed in the presence or absence of solvents or diluents and with the addition of condensing agents. Condensing agents of this kind are, for instance, the mineral acids, such as hydrochloric acid or sulfonic acid. The starting materials may be used in about equal proportions. It is, however, suitable to use about 60 to 100 parts of cresol or phenol for 100 parts of lignin; about 30 to 40 parts of phenol or about 60 to 80 parts of cresol for 100 parts of peat; about 10 to 20 parts of phenol or about 30 parts of cresol for 100 parts of lignite.

The introduction of methyl sulfonic acid groups into the products of the reaction obtained is suitably effected as follows: the products of the reaction or their alkali metal compounds are caused to act, in an aqueous solution, with formaldehyde and sulfurous acid or the salts thereof, for instance sodium sulfite, sodium bisulfite, potassium sulfite and ammonium sulfite. For 100 parts of the condensation product there are suitably used about 75 parts of aqueous formaldehyde of 30 per cent. strength and about 65 parts of sodium sulfite or the corresponding quantity of the free acid or another salt. An upper limit of the quantities of formaldehyde and sulfite is not given. The more one uses, the more rapidly the condensation products become soluble in water. Merely for economical reasons it is advisable to use not too large a quantity.

The products obtained are soluble in water even after they have been acidified and in the acid condition they constitute very good tanning agents. With the aid of these tanning agents there is obtained a brown plump leather of the quebracho character and having the odor characteristic for the leather tanned with vegetable means.

The following examples serve to illustrate the invention, but they are not intended to limit it thereto, the parts being by weight:

(1) Into the fused mass of 1000 parts of crude cresol there are introduced at the oil bath temperature of 130° C. to 140° C. 250 parts of hydrochloric acid lignin and as condensing agent 10 parts of concentrated hydrochloric acid. After half an hour further 250 parts of lignin are added; this addition is repeated as soon as the product has become soluble in alkali. A condensation product is thus obtained which contains about 1300 parts of lignin for 1000 parts of cresol.

1000 parts of the resin thus obtained are pulverized, suspended in 3000 parts of water and the suspension is heated within 1 hour to 100° C. together with 750 parts of formaldehyde solution of 30 per cent. strength and 650 parts of sodium sulfite. After the whole has been stirred for 3 to 5 hours the condensation product has become soluble in water and sufficiently soluble in acid.

(2) 1000 parts of phenol are heated for 2 hours, while stirring, to 90° C. to 95° C., together with 200 parts of lignin obtained during the saccharification of pine wood with concentrated hydrochloric acid, and 5 parts of hydrochloric acid of 35 per cent. strength. The product obtained which is soluble in alkali is freed from the excess of free phenol by a distillation with steam, then dried and ground. 100 parts of the product thus obtained are heated for 2 hours to 95° C. together with 60 parts of sodium sulfite, 40 parts of formaldehyde solution of 30 per cent. strength and 300 parts of water. A brown solution is obtained which even after having been acidified does not form any precipitate.

If pelt is tanned in the usual manner with the acidified solution thus obtained, a brown, plump leather is obtained which may be washed and further treated as usual.

(3) 500 parts of phenol are heated for 8 hours to 80° C. to 90° C. together with 150 parts of lignin obtained during the saccharification of pine wood with dilute sulfuric acid with application of pressure, while adding 3 parts of sulfuric acid of 40 per cent. strength. From the product obtained 350 parts of free phenol are distilled under a pressure of 10 mm. of mercury. The residue from the distillation is then comminuted. 50 parts thereof in 150 parts of water are heated for 4 hours to 90° C. together with 20 parts of sodium sulfite and 25 parts of formaldehyde solution of 30 per cent. strength.

By an acidification with hydrochloric acid up to a pH value of 3.1, there is obtained a tanning solution which can directly be used for tanning. A brown plump leather is obtained.

(4) 150 parts of the residue of saccharification obtained during the treatment of chips of pine wood with hydrofluoric acid of a high concentration, are stirred at 100° C. together with 400 parts of phenol and 2 parts of concentrated hydrochloric acid. The main portion of the free phenol is eliminated from the alkali soluble reaction product by distillation under reduced pressure, the rest by washing the product with hot water. The product thus obtained is rendered soluble in water by means of formaldehyde and sodium sulfite, as described in Example 3. With the aid of this tanning substance a leather of good firmness and solidity is obtained.

(5) 100 parts of lignite, 500 parts of phenol and 1.5 parts of sulfuric acid of 60 per cent. strength are heated to 100° C., while stirring for 5 hours. The main portion of the free phenol is eliminated by a distillation under reduced pressure of 8 to 10 mm. of mercury and a temperature of the bath up to 150° C.; the rest is eliminated by a distillation with steam. 100 parts of the condensation product thus obtained are then dissolved in dilute caustic soda solution. After the addition of 30 parts of formaldehyde solution the whole is introduced at 80° C., while stirring, into gaseous sulfurous acid, until a clear solution is obtained.

On tanning pelt with the solution thus obtained which has been acidified with acetic acid and to which is added 10 per cent. of a condensation product from cresol sulfonic acid and formaldehyde a light colored plump leather is obtained.

(6) Into a pressure vessel 1000 parts of fused phenol, 600 parts of hydrochloric acid lignin and 10 parts of sulfuric acid of 40 per cent. strength are introduced. The whole is then heated to 120° C. to 125° C., while stirring. As soon as the mass has become thinly liquid, 200 parts of hydrochloric acid lignin are again added and this operation is repeated until 1200 parts of lignin have been introduced altogether. As soon as the reaction is complete, the product is ground and rendered soluble in water by treating it with sodium sulfite and formaldehyde. The tanning substance has the properties of that described in Example 2.

(7) 800 parts of ortho-cresol, 200 parts of dried peat turf and 20 parts of concentrated hydrochloric acid are heated for 6 hours to 100° C. to 105° C. The product obtained which is soluble in alkali is freed from the free ortho-cresol by a distillation under reduced pressure, then reduced to small pieces and heated to 100° C. together with 850 parts of water, 150 parts of sodium sulfite and 160 parts of formaldehyde solution, until it has become entirely soluble in water. For improving its plump action in the tanning process the product may be after-treated with di-hydroxy-diphenyl sulfone and formaldehyde.

(8) Into 100 parts of fused phenol 25 parts of hydrochloric acid lignin are introduced at 110° C. to 120° C. while stirring. After stirring for half an hour there are again added 25 parts of lignin, after a further stirring altogether 80 parts of lignin in portions of 20 to 30 parts.

25 parts of the product obtained which is soluble in alkali are stirred at 95° C. in 75 parts of water together with 18 parts of sodium sulfite and 20 parts of formaldehyde solution of 30 per cent. strength until the product has become soluble in water.

The solution obtained is acidified with sulfuric acid and oxalic acid and is then ready for tanning. The leather tanned therewith is of a brown color, plump and of good firmness and solidity.

(9) 50 parts of lignin are introduced within 1 hour, at a temperature of about 180° C. to 200° C. into 200 parts of salicylic acid. The mixture is further stirred for 4 hours at this temperature. From the product obtained which is soluble in alkali the excess of salicylic acid is washed out with hot water.

25 parts of the salicylic acid lignin thus prepared are treated in 70 parts of water with 18 parts of sodium sulfite and 20 parts of formaldehyde solution of 30 per cent. strength. After the product has been stirred for 5 hours it is soluble in water and may be used for tanning after it has been acidified.

(10) 50 parts of lignin are introduced within 1 hour, while stirring, at a temperature of 140° C. to 150° C. into a mixture of 150 parts of beta-naphthol and 50 parts of phenol. The product is stirred at the same temperature until it has become soluble in alkali. The excess of the mixture of beta-naphthol and phenol is then washed out with hot water.

25 grams of the dried and pulverized residue are stirred together with 60 parts of water and 20 parts of sodium sulfite and into this mixture 40 parts of formaldehyde of 15 per cent. strength are caused to drop at 95° C. Heating is continued, while stirring at 95° C. until the product has become soluble in water and no longer precipitates even when being acidified. After the addition of sulfuric acid and acetic acid it may be used for tanning.

We claim:

1. The products obtainable by introducing methyl sulfonic acid groups into the condensation products of hydroxy aryl compounds with solid products containing a substance of the group consisting of cellulose, lignin and humin, said products being soluble in water and having a tanning effect in acid mediae.

2. The products obtainable by causing formaldehyde and a substance of the group consisting of sulfurous acid, its alkali metal salts and its ammonia salt to act in aqueous solution upon the condensation products of hydroxy aryl compounds with solid products containing a substance of the group consisting of cellulose, lignin and humin, said products being soluble in water and having a tanning effect in acid mediae.

3. The products obtainable by causing formaldehyde and a substance of the group consisting of sulfurous acid, its alkali metal salts and its ammonia salt to act in aqueous solution upon the condensation products of hydroxy aryl compounds with solid compounds containing lignin, said products being soluble in water and having a tanning effect in acid mediae.

4. The products obtainable by causing formaldehyde and a substance of the group consisting of sulfurous acid, its alkali metal salts and its ammonia salt to act in aqueous solution upon the condensation products of technical crude cresol with solid compounds containing lignin, said products being soluble in water and having a tanning effect in acid mediae.

5. The product obtainable by causing aqueous formaldehyde and sodium sulfite to act upon the condensation product of lignin with crude cresol, said product being soluble in water and having a tanning effect in acid mediae.

6. The product obtainable by causing aqueous formaldehyde and sulfurous acid to act in the presence of dilute caustic soda solution upon the condensation product of lignite with phenol, said product being soluble in water and having a tanning effect in acid mediae.

7. The product obtainable by causing aqueous formaldehyde and sodium sulfite to act upon the condensation product of phenol with lignin obtained during the saccharification of pine wood with dilute sulfuric acid with application of pressure, said product being soluble in water and having a tanning effect in acid mediae.

8. The process which comprises introducing methyl sulfonic acid groups into the condensation products of hydroxy aryl compounds with solid products containing a substance of the group consisting of cellulose, lignin and humin.

9. The process which comprises causing formaldehyde and a substance of the group consisting of sulfurous acid, its alkali metal salts and its ammonia salt to act in aqueous solution upon the condensation products of hydroxy aryl compounds with solid products containing a substance of the group consisting of cellulose, lignin and humin.

10. The process which comprises causing formaldehyde and a substance of the group consisting of sulfurous acid, its alkali metal salts and its ammonia salt to act in aqueous solution upon the condensation products of hydroxy aryl compounds with solid compounds containing lignin.

11. The process which comprises causing formaldehyde and a substance of the group consisting of sulfurous acid, its alkali metal salts and its ammonia salt to act in aqueous solution upon the condensation products of technical crude cresol with solid compounds containing lignin.

12. The process which comprises causing aqueous formaldehyde and sodium sulfite to act upon the condensation product of lignin with crude cresol.

13. The process which comprises causing aqueous formaldehyde and sulfurous acid to act in the presence of dilute caustic soda solution upon the condensation product of lignite with phenol.

14. The process which comprises causing aqueous formaldehyde and sodium sulfite to act upon the consensation product of phenol with lignin obtained during the saccharification of pine wood with dilute sulfuric acid with application of pressure.

ERNST KOCH.
CHRISTOPH THOMSEN.